(12) United States Patent
Ardito et al.

(10) Patent No.: US 12,549,212 B2
(45) Date of Patent: Feb. 10, 2026

(54) TACTICAL AIR NAVIGATION SYSTEM ISOLATION FROM RECEIVER WITH SHARED ANTENNA

(71) Applicant: StarNav, LLC, Walnut, CA (US)

(72) Inventors: Christian Ardito, Victorville, CA (US); Joshua Morales, Colton, CA (US)

( * ) Notice: Subject to any disclaimer, the term of this patent is extended or adjusted under 35 U.S.C. 154(b) by 520 days.

(21) Appl. No.: 17/939,888

(22) Filed: Sep. 7, 2022

(65) Prior Publication Data

US 2023/0070170 A1 Mar. 9, 2023

Related U.S. Application Data

(60) Provisional application No. 63/241,494, filed on Sep. 7, 2021.

(51) Int. Cl.
| | | |
|---|---|---|
| *H04B 1/18* | (2006.01) | |
| *H01P 1/36* | (2006.01) | |
| *H01P 1/38* | (2006.01) | |
| *H01P 5/12* | (2006.01) | |
| *H03F 3/19* | (2006.01) | |
| *H03H 11/04* | (2006.01) | |
| *H04B 1/525* | (2015.01) | |

(52) U.S. Cl.
CPC .............. *H04B 1/18* (2013.01); *H01P 1/36* (2013.01); *H01P 1/38* (2013.01); *H01P 5/12* (2013.01); *H03F 3/19* (2013.01); *H03H 11/04* (2013.01); *H04B 1/525* (2013.01); *H03F 2200/294* (2013.01)

(58) Field of Classification Search
CPC ...... H01P 1/36; H01P 1/38; H01P 5/12; H03F 1/52; H03F 2200/211; H03F 2200/294; H03F 2200/451; H03F 3/19; H03H 11/04; H03H 7/46; H03H 7/48; H04B 1/18; H04B 1/525
See application file for complete search history.

(56) References Cited

U.S. PATENT DOCUMENTS

| | | | | |
|---|---|---|---|---|
| 6,643,522 B1 * | 11/2003 | Young | ................... | H04B 1/406 455/552.1 |
| 10,177,722 B2 * | 1/2019 | Wang | ................... | H04B 1/401 |
| 2011/0032854 A1 * | 2/2011 | Carney | ................... | H03F 3/72 370/294 |

* cited by examiner

*Primary Examiner* — Timothy X Pham
(74) *Attorney, Agent, or Firm* — Andrew Morabito

(57) ABSTRACT

The present invention is a signal isolation device comprising: a first circulator; a second circulator connected to the first circulator; a first radio frequency switch connected to the second circulator; an adjustable radio frequency limiter connected to the first radio frequency switch; a low noise amplifier connected to the adjustable radio frequency limiter; a bandpass filter connected the low noise amplifier; a power splitter connected the bandpass filter; an attenuator connected to the power splitter; a second radio frequency switch connected to the power splitter; an active filter chain connected to the second radio frequency switch; a third circulator connected to the attenuator and the first circulator; a power detector connected to the third circulator; and a trigger generator connected to the power detector.

15 Claims, 3 Drawing Sheets

TACTICAL AIR NAVIGATION SYSTEM ISOLATION FROM RECEIVER WITH SHARED ANTENNA

CROSS-REFERENCE TO RELATED APPLICATIONS

This application is a continuation-in-part (and claims the benefit of priority under 35 USC 120) of U.S. application No. 63/241,494 filed Sep. 7, 2021. The disclosure of the prior applications is considered part of (and is incorporated by reference in) the disclosure of this application.

BACKGROUND

This disclosure relates generally to a Tactical Air Navigation System (TACAN), and more specifically to a device which allows for a receiver to share an antenna with a TACAN interrogator.

TACAN equipment is used on most military aircraft to provide an indication of the distance and bearing to any selected TACAN station. In a TACAN system, a ground station transmits TACAN pulses at a rate of approximately 2700 per second. The ground station antenna rotates approximately 15 times per second and has an antenna directivity pattern which has a cardioid component to it. This causes the pulses received by the aircraft to have a 15 hertz modulation of plus or minus 20% amplitude and a phase which depends upon the aircraft's bearing with respect to the TACAN station. The transmitter also sends a reference pulse code once each antenna cycle at a fixed point in the antenna rotation to establish an absolute reference phase. The aircraft equipment determines the bearing by comparing the phase of the amplitude modulated signal with the reference phase pulses.

In general, DME (Distance Measuring Equipment) which measures a distance from a ground equipment to an aircraft has been widely employed as a navigational guidance system for aircraft to obtain position information of the aircraft. In DME, an electromagnetic wave modulated by a pulse waveform is transmitted from a party requiring distance measurement information (interrogator) for instance, an aircraft, and a reply pulse is transmitted from a second party (transponder) for instance, a ground station, following the reception of the electromagnetic pulse. An aircraft determines the distance between itself and the other party by measuring the time period between the transmission of the pulse and the reception of the reply pulse.

Typically, a global positioning system includes a receiver for receiving radio waves transmitted from four or more GPS satellites. The global positioning system determines the position of a reception point where the receivers have received the radio waves, based on quasi-distance data between the GPS satellites and the reception point, including a time offset of the receiver, and positional data of the GPS satellites.

Many aircrafts (both military and civilian) are fitted with Distance Measurement Equipment (DME), TACAN, and some form of Global Positioning Systems (GPS), with the most current civilian version being L5. In many instances these signal bands overlap. However, these aircrafts are likely fitted with a different antenna or receiver for each system. This creates a redundancy in the hardware that is either unnecessary or not cost effective.

Therefore, it is desired for a device to be integrated into the aircraft that is able to receive and process each of the measurement systems while using the fewest number of antennas.

SUMMARY

The present invention in a first embodiment, is a signal isolation device comprising: a first circulator; a second circulator connected to the first circulator; a first radio frequency switch connected to the second circulator; an adjustable radio frequency limiter connected to the first radio frequency switch; a low noise amplifier connected to the adjustable radio frequency limiter; a bandpass filter connected the low noise amplifier; a power splitter connected the bandpass filter; an attenuator connected to the power splitter; a second radio frequency switch connected to the power splitter; an active filter chain connected to the second radio frequency switch; a third circulator connected to the attenuator and the first circulator; a power detector connected to the third circulator; and a trigger generator connected to the power detector.

The present invention in a second embodiment, is a signal isolation device comprising: a first circulator; a second circulator connected to the first circulator; a low noise amplifier connected to the second circulator; and a power splitter connected to the low noise amplifier and the first circulator.

DETAILED DESCRIPTION

Figure 1:
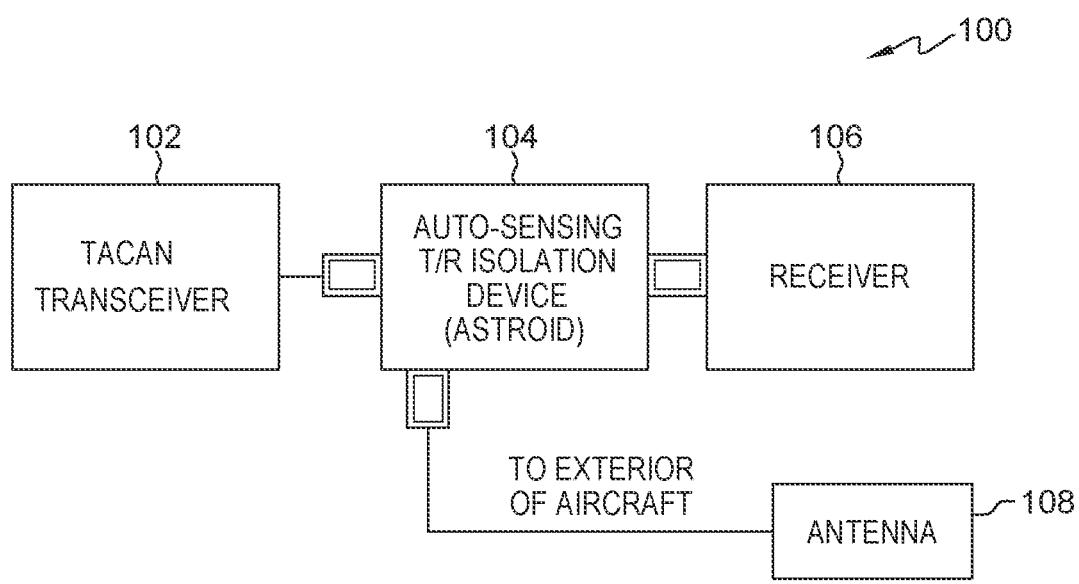
FIG. 1 depicts an image of an environment in which the present invention operates, in accordance with an embodiment of the present invention.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects may generally be referred to herein as a "circuit," "module", or "system." Furthermore, aspects of the present invention may take the form of a computer program product embodied in one or more computer readable medium(s) having computer readable program code/instructions embodied thereon.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

The present invention provides for the advantage of allowing aircrafts that are equipped with DME, GPS, and TACAN systems to use a single antenna or fewer antennas than initially permitted through the use of an autosensing transmit/receive isolation device (hereinafter "ASTROID"). The GPS, DME, and TACAN signal bands are overlapping, which means the same antenna can effectively be used for any of these systems. To avoid installation of new antennas on vehicles, it is desired to utilize DME/TACAN antennas already mounted on the vehicles, aircrafts, or stations. The low loss splitting, and isolation device provides a simplified system design while obtaining signal values of equal or better values.

Presently, a DME/TACAN system transmits a powerful signal that is received by an antenna that is connected to devices and components. This signal is typically too powerful to be wire-connected to a receiver directly. The receiver works with one or more Global Navigation Satellite System (GNSS), for example GPS, Galileo, GLONASS, or the like systems that are in use. The receiver is designed for a specific GNSS and also for a specific signal (e.g., L1, L5, E3, or the like). In some embodiments there may be multiple receivers integrated into the system to work with the different GNSS and for different signal strengths. Thus, if the TACAN system is not split and plugged directly into a receiver, the TACAN systems signal would overpower the receiver and damage or destroy the receiver. Thus, a device is needed to isolate the DME/TACAN systems signal from the receivers that can now be split from the TACAN system antennas that are already mounted on aircrafts, so the receiver(s) is/are not destroyed.

FIG. 1 depicts an environment 100 where the ASTROID is integrated into the positioning systems, in accordance with one embodiment of the present invention. As shown the TACAN transceiver (e.g., system or device) 102 is connected to the ASTROID 104. This device is then connected to the receiver 106 and the aircraft antenna(s) 108. In some embodiments, the ASTROID 104 may have the ability to connect to multiple receivers 106. This would allow the present invention to work with different GNSS and with different signal strengths. In various embodiments, the ASTROID 104 may be connected to a number of antennas or different types of receivers based on the internal structure of the ASTROID.

Figure 2:
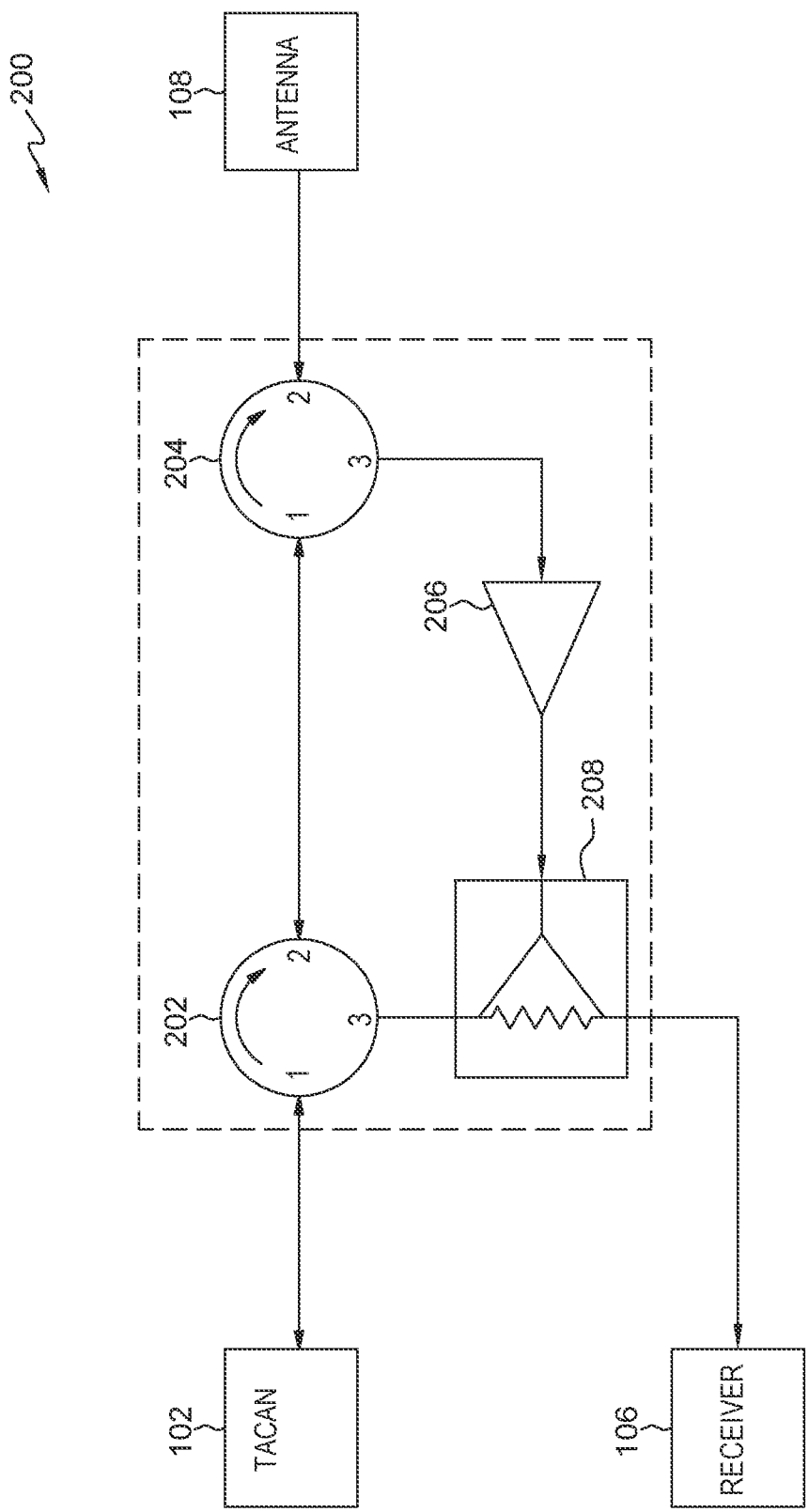
FIG. 2 depicts a block diagram of an isolation device, in accordance with an embodiment of the present invention.

FIG. 2 depicts an image of the internal components of the ASTROID 200, in accordance with one embodiment of the present invention. The depicted device is comprised of two circulators 202 and 204, a low noise amplifier (LNA) 206, and a power splitter 208.

The first circulator 202 is connected to the TACAN transceiver 102 and a second circulator 204. The circulators are passive non-reciprocal device that allows a signal to exit through a port directly after the one it entered. The first circulator 202 allows for the signal to transfer from the TACAN transceiver 102 to the second circulator 204 or from the power splitter 208 to the TACAN transceiver 102. The second circulator 204 allows the signal to transfer from the first circulator 202 to the antenna 108, or from the antenna 108 to the LNA 206. In additional embodiments, where additional components are added to the system the circulators may have four or more ports, and there may be additional circulators in the ASTROID.

The LNA 206 is used to amplify the low power signal which is received from the antenna 108 without degrading the signal-to-noise ratio and send the amplified signal to the power splitter 208. The power splitter 208 is able to split the signal to go towards (1) the receiver 106 and (2) the first circulator 202. The power splitter 208 is able to condition the signal so that the receiver 106, receives a signal that will not damage the receiver 106. In some embodiments where there are multiple receivers, there may need additional power splitters and circulators to be incorporated into the system so that each receiver receives the proper signal and so that the signal is properly conditioned.

Based on the present invention of the ASTROID 200 design, the ASTROID 200 is able to connect the antenna 108 to a receiver 106 with a loss of less than 1.5 dB; the receiver 106 return loss greater than 10 dB; connect the TACAN transceiver 102 to the antenna 108 with a loss of less than 1.5 dB; the TACAN transceiver 102 return loss greater than 10 dB; and a stop band isolation larger than 40 dB. Other values can be achieved based on the type of TACAN transceiver 102, Circulators, Antenna 108, LNA 206, power splitter 208, and receiver 106 design. The ASTROID 200 is designed to operate with an L5 receiver 106 but can be modified to work with other signals both civilian and military. This requires the power splitter 208 to split the power to an acceptable and workable level based on the receiver limits and requirements.

Figure 3:
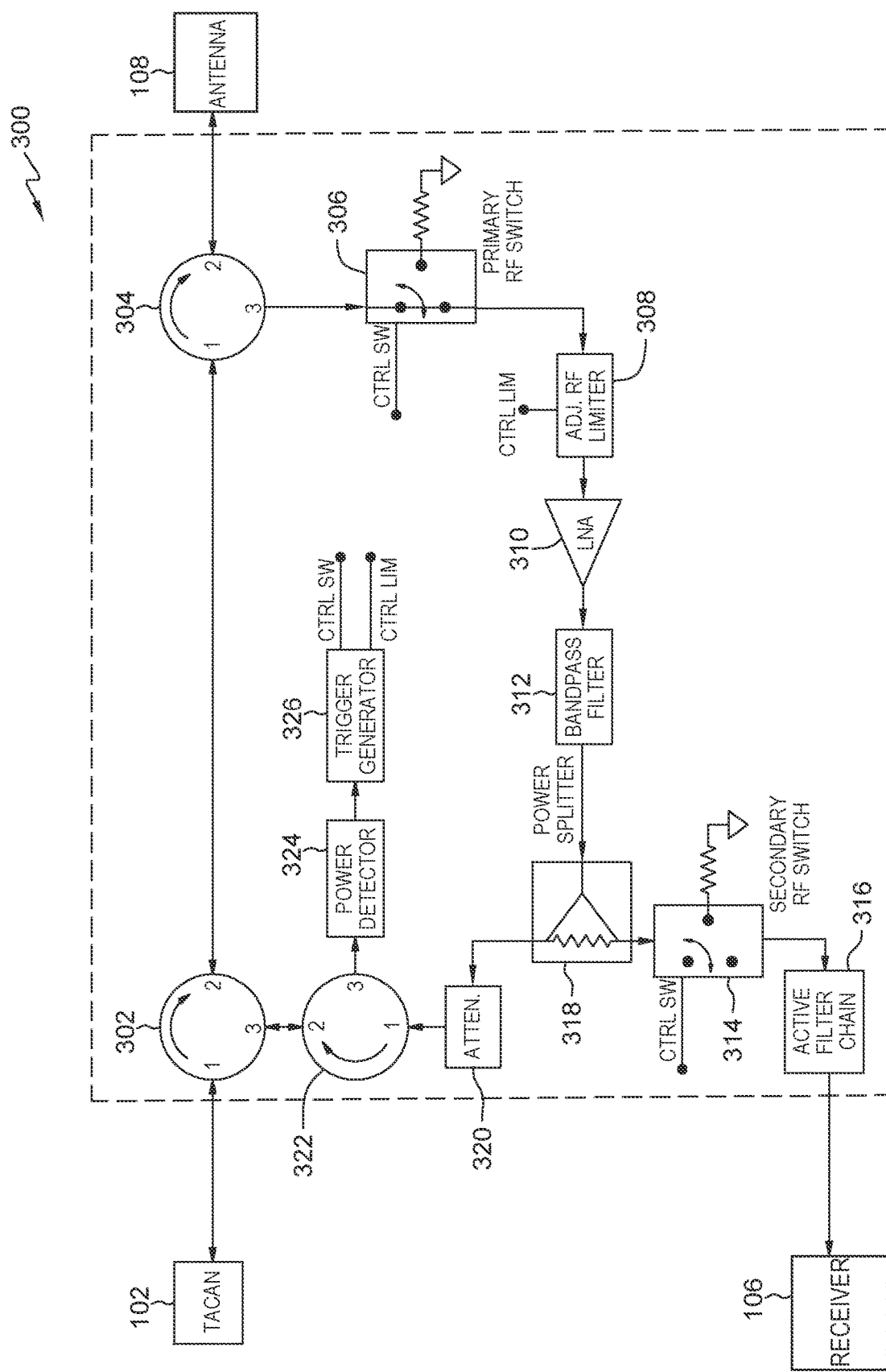
FIG. 3 depicts a block diagram of the isolation device, in accordance with another embodiment of the present invention.

FIG. 3 depicts an image of the internal components of the ASTROID 300, in accordance with another embodiment of the present invention. The device is comprised of three circulators (302, 304, and 322), two radio frequency (RF) switches (306 and 314), an adjustable RF power limiter 308, a low noise amplifier (LNA) 310, a bandpass filter 312, a power splitter 318, an attenuator 320, an active filter chain 316, a power detector 324, and a trigger generator 326.

The present invention may include computing system or device that is able to collect data from the various components and transmit that data to an external device. In these embodiments a computer readable storage medium (or media) having computer readable program instructions thereon for causing a processor to carry out aspects of the present invention.

The present embodiment of the ASTROID 300 shown with the internal components identified and connected to external devices. The first circulator 302 is connected to the TACAN transceiver 102, the second circulator 304, and the third circulator 322. The second circulator 304 allows the signal to transfer from the first circulator 302 to the antenna 108, or from the antenna 108 towards the LNA 308 through a primary RF switch 306 and an adjustable RF limiter 308. The primary RF switch 306 is used to route high frequency signals through transmission paths that are received by the second circulator 304. The adjustable RF limiter 308 is used to prevent damage to the LNA 310 by attenuating the received signal to a power level that the LNA 310 is able to receive without damage. The primary RF switch 306 and adjustable RF limiter 308 are used to prevent excess leakage power that could damage the LNA 310. The LNA 310 is used to amplify the low power signal which is received from the antenna without degrading the signal-to-noise ratio and send the amplified signal through the bandpass filter 312 to the power splitter 318.

The bandpass filter 312 is used as a frequency selective device to limit out-of-band interference. The power splitter 318 is able to split the signal to go towards (1) the receiver through a secondary RF 314 switch and active filter chain 316 and (2) towards the third circulator 322 through an attenuator 320. The power splitter 318, secondary RF switch 314, and active filter chain 316 condition the signal so that the receiver 106, receives a signal that will not damage the receiver 106. The active filter chain 316 is an analog circuit implementing an electronic filter using active components to assist in adjusting the signal received or limiting the filter received from the power splitter 318, so it can be received by the receiver 106 without causing any damage. In one embodiment, the active filter chain 316 rejects all signals that are outside of a predetermined range (such as 960-1150 MHz by 120 dB). The range is based on the components which make up the active filter chain 316. In one embodiment, the active filter chain 316 is comprised of a Surface Acoustic Wave (SAW) Band Pass Filter (BPF)s, Attenuators, LNAs, and Reflectionless Low-Pass Filters (LPF)s. In additional embodiments, different components may be used, and components of different ranges as well. The active filter chain 316, in additional embodiments, may be a plurality of components based on the receiver 106 type and the received signal. In additional embodiments, the active filter chain 316 may be comprised of passive components.

The third circulator 322 is also used to route leakage power into a power detector 324. The third circulator 322 received the signal from the power splitter 318 after the signal has been passed through an attenuator 320. The attenuator 320 assists in reducing the power of the signal without distorting the signals waveform. In various embodiments, the attenuator 320 may have varying designs based on the received signal's power. The power detector 324 generates a voltage proportional to input power. The output of the power detector 324 enters the trigger generator 326. The trigger generator 326 creates the control signals that actuate the RF switches 306 and 314 and adjustable RF limiter 308 to protect the LNA 310 in case of excess leakage power.

Based on the present ASTROID design, the ASTROID is able to connect the antenna 108 to the receiver 106 with a loss of less than 1.5 dB; the receiver 106 return loss greater than 10 dB; connect the TACAN transceiver 102 to the antenna 108 with a loss of less than 1.5 dB; the TACAN transceiver 102 return loss greater than 10 dB; and a stop band isolation larger than 40 dB. Other values can be achieved based on the type of TACAN transceiver circula-tors, antenna, LNA, power splitter, receiver, and other component design. In one embodiment, the ASTROID is designed to operate with an L5 receiver(s). In other embodiments, the ASTROID can work with other types of receivers. Through replacement or modifications to the components, the ASTROID can be modified to work with other signals both civilian and military. In various embodiments, this requires the power splitter to split the power to an acceptable and workable level based on the receiver limits and requirements. In additional embodiments, where additional components (e.g., receivers and antenna) are added to the system the circulators may have 4 ports, and there may be additional circulators in the ASTROID. In some embodiments where there are multiple receivers, and thus there may need to be additional power splitters, RF switches, active filter chains, LNA, RF limiters, and circulators to be incorporated into the system so that each receiver has the signal altered to meet the specific receivers limitations and maximums, this is necessary so that each receiver, receives the proper signal and a signal that will not damage the receiver.

In the depicted embodiments, a variety of electrical components are shown. Each of these elements may have varying operating ranges or maxes and minimum operating values based on the specific application of the invention. Based on the TACAN transceivers operating ranges, the receivers operating ranges, and the antennas operating ranges, the components are variable. In additional embodiments, additional components may be incorporated into the design to provide safe operation of the device and the internal components.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

In some embodiments, components can be added to the device to provide warnings, fail safes, shutoffs, and additional features to alert aircraft operators or ground personnel. For example, a device can be added between the power splitter and the receiver to monitor the signal to confirm that the signal is within an acceptable range.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

What is claimed is:
1. A signal isolation device comprising:
a first circulator;
a second circulator connected to the first circulator;
a first radio frequency switch connected to the second circulator;
an adjustable radio frequency limiter connected to the first radio frequency switch;
a low noise amplifier connected to the adjustable radio frequency limiter;

a bandpass filter connected the low noise amplifier;
a power splitter connected the bandpass filter;
an attenuator connected to the power splitter;
a second radio frequency switch connected to the power splitter;
an active filter chain connected to the second radio frequency switch;
a third circulator connected to the attenuator and the first circulator;
a power detector connected to the third circulator; and
a trigger generator connected to the power detector.

2. The signal isolation device of claim 1, wherein the second circulator is connected to an antenna before the low noise amplifier.

3. The signal isolation device of claim 1, wherein the power splitter is connected to a receiver.

4. The signal isolation device of claim 1, wherein the first circulator is connected to a Tactical Air Navigation (TACAN) transceiver before the second circulator and the power splitter.

5. The signal isolation device of claim 1, wherein the attenuator has an attenuation of 3 dB.

6. The signal isolation device of claim 1, wherein the active filter chain has a value range of as 960-1150 Mhz.

7. A signal isolation device comprising:
at least one circulator;
at least one radio frequency switch connected to the at least one circulator;
a low noise amplifier connected to the at least one radio frequency switch;
a power splitter connected the low noise amplifier; and
wherein one of the at least one circulator are connected to a Tactical Air Navigation (TACAN) transceiver and another one of the at least one circulators are connected to an antenna, and the power splitter is connected to a low noise amplifier.

8. The signal isolation device of claim 7, further comprising, an adjustable radio frequency limiter connected to the first radio frequency switch.

9. The signal isolation device of claim 8, further comprising, a bandpass filter connected the low noise amplifier.

10. The signal isolation device of claim 9, further comprising, an attenuator connected to the power splitter.

11. The signal isolation device of claim 10, wherein one of the radio frequency switches are connected to the power splitter.

12. The signal isolation device of claim 11, further comprising, an active filter chain connected to the second radio frequency switch.

13. The signal isolation device of claim 10, wherein one of the circulators are connected to the attenuator.

14. The signal isolation device of claim 13, further comprising, a power detector connected to one of the circulators.

15. The signal isolation device of claim 14, further comprising, a trigger generator connected to the power detector.

* * * * *